United States Patent
Kanda et al.

(10) Patent No.: US 11,891,504 B2
(45) Date of Patent: Feb. 6, 2024

(54) POLYACETAL RESIN COMPOSITION AND AUTOMOBILE PART

(71) Applicant: Polyplastics Co., Ltd., Tokyo (JP)

(72) Inventors: Yuuki Kanda, Fuji (JP); Tomohiro Monma, Fuji (JP); Hiroki Arai, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 18/030,582

(22) PCT Filed: Sep. 10, 2021

(86) PCT No.: PCT/JP2021/033271
§ 371 (c)(1),
(2) Date: Apr. 6, 2023

(87) PCT Pub. No.: WO2022/075004
PCT Pub. Date: Apr. 14, 2022

(65) Prior Publication Data
US 2023/0374288 A1  Nov. 23, 2023

(30) Foreign Application Priority Data
Oct. 9, 2020  (JP) .................. 2020-171199

(51) Int. Cl.
*C08L 59/00* (2006.01)
*C08K 3/04* (2006.01)
*C08K 5/00* (2006.01)
*C08K 7/18* (2006.01)

(52) U.S. Cl.
CPC ............. *C08L 59/00* (2013.01); *C08K 3/04* (2013.01); *C08K 5/005* (2013.01); *C08K 7/18* (2013.01); *C08K 2201/003* (2013.01)

(58) Field of Classification Search
CPC .......... C08L 59/00; C08K 3/04; C08K 5/005; C08K 7/18; C08K 2201/003

USPC ........................................... 524/593
See application file for complete search history.

(56) References Cited

U.S. PATENT DOCUMENTS

| | | | |
|---|---|---|---|
| 2010/0056676 A1* | 3/2010 | Hase | C08K 5/13 524/186 |
| 2016/0333170 A1* | 11/2016 | Oshima | C08K 5/25 |

FOREIGN PATENT DOCUMENTS

| | | |
|---|---|---|
| JP | H4-272953 A | 9/1992 |
| JP | H07-002891 B2 | 1/1995 |
| JP | 2004-502014 A | 1/2004 |
| JP | 2004-526596 A | 9/2004 |
| JP | 2015-209474 A | 11/2015 |
| JP | 6-386124 B1 | 9/2018 |
| JP | 6-691171 B2 | 4/2020 |
| WO | 2013/108834 A1 | 7/2013 |
| WO | 2018/180078 A1 | 10/2018 |
| WO | 2019/244477 A1 | 12/2019 |

OTHER PUBLICATIONS

Office Action dated Feb. 22, 2022, issued in counterpart JP Application No. 2020-171199, with English translation. (4 pages).
Office Action dated May 10, 2022, issued in counterpart Application No. 2020-171199, with English translation. (5 pages).

* cited by examiner

*Primary Examiner* — Edward J Cain
(74) *Attorney, Agent, or Firm* — WHDA, LLP

(57) ABSTRACT

A polyacetal resin composition contains a polyacetal copolymer (A) in an amount of 100 parts by mass, the polyacetal copolymer resin having a hemiformal terminal group amount of 0.8 mmol/kg or less, an antioxidant (B) in an amount of 0.5 to 3.0 parts by mass, at least one of zinc oxide or magnesium oxide (C) having an average particle diameter of 5 μm or less in an amount of more than 2.0 parts by mass and 12 parts by mass or less, carbon black (D) having a BET specific surface area of 300 to 400 $m^2/g$ in an amount of 5.0 to 16 parts by mass, and polyalkylene glycol (E) in an amount of 0.5 to 3.0 parts by mass.

6 Claims, 1 Drawing Sheet

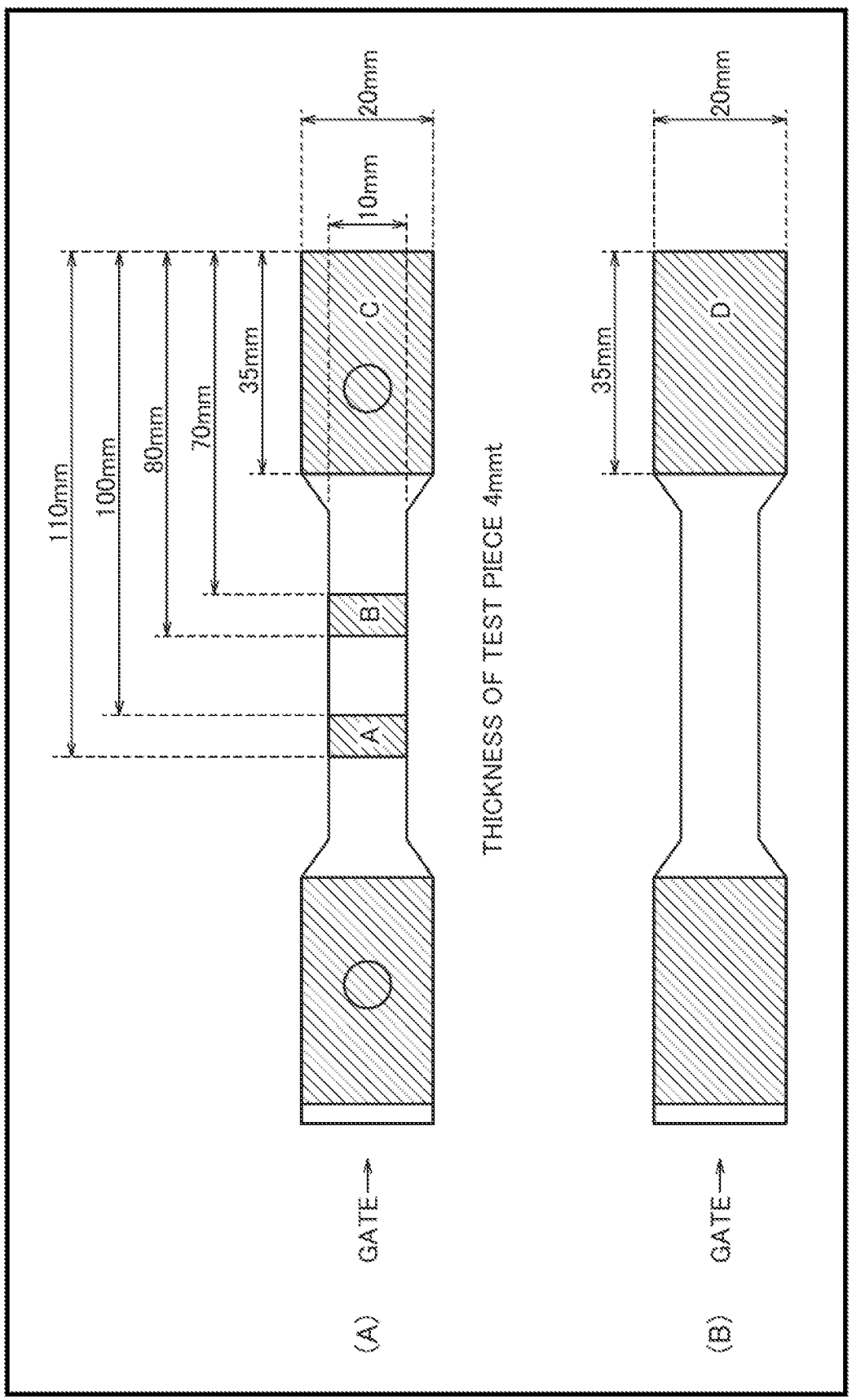

POLYACETAL RESIN COMPOSITION AND AUTOMOBILE PART

TECHNICAL FIELD

The present invention relates to a polyacetal resin composition, an automobile part obtained by molding the polyacetal resin composition, and a method for improving resistance to an acid component while providing conductivity to a polyacetal resin molded article.

BACKGROUND ART

A polyacetal resin or a polyacetal copolymer (hereinafter, also referred to as a "POM resin") is excellent in various physical and mechanical properties, chemical resistance, and slidability, and hence is used as engineering plastic in various fields. For example, the POM resin is excellent in resistance to hydrocarbon fuels such as gasoline, and hence is used as a flange or a case-like molded article in a periphery of a fuel pump of an automobile.

Meanwhile, in certain regional areas, a cleaner having strong acidity (pH=approximately 1) is often used as a cleaning agent for an automobile wheel. Further, when a droplet of the cleaner adheres to an exposed portion of the above-mentioned flange at the time of using the cleaner, the flange surface may be degraded (decomposed) due to poor resistance of the POM resin to an acid component. As a result, the flange may crack from the degraded portion as a starting point.

In view of this, for the purpose of improving resistance of the POM resin to an acid component, the applicant of the present application has proposed a POM resin composition to which a large amount of magnesium oxide or the like being a base is added (see Patent Literature 1 and Patent Literature 2).

Meanwhile, for the purpose of preventing ignition to fuels due to static electricity, in a case of a molded article used in the periphery of the above-mentioned fuel pump, it is required to provide conductivity to the molded article and prevent electrification. As a measure to provide conductivity to the POM resin, it has been known to add a conductive filler such as carbon black and carbon fibers (see Patent Literature 3 and Patent Literature 4).

CITATION LIST

Patent Literature

[Patent Literature 1] Japanese Patent No. 6386124
[Patent Literature 2] Japanese Patent No. 6691171
[Patent Literature 3] Japanese Examined Patent Publication No. 07-002891
[Patent Literature 4] Japanese Translation of PCT International Application Publication No. 2004-526596

SUMMARY OF INVENTION

Technical Problem

However, when the magnesium oxide or the like is added in order to provide resistance to an acid component, and the conductive filler such as carbon black is further added in order to exert an anti-static effect, toughness of the POM resin composition is significantly degraded, which causes a problem. In other words, both an anti-static effect and resistance to an acid component are to be exerted at the same time in the POM resin composition, which leads to significant degradation of toughness.

The present invention has been made in view of the above-mentioned problem in the related art, and has an object to provide a POM resin composition and an automobile part to which resistance to an acid component and an anti-static effect are provided without significant degradation of toughness, and a method for providing an anti-static effect to a POM resin molded article and improving resistance to an acid component.

Solution to Problem

In order to solve the above mentioned problem, an aspect of the present invention is as below.

(1) A polyacetal resin composition, containing:
  a polyacetal copolymer (A) in an amount of 100 parts by mass, the polyacetal copolymer resin having a hemiformal terminal group amount of 0.8 mmol/kg or less;
  an antioxidant (B) in an amount of 0.5 to 3.0 parts by mass;
  at least one of zinc oxide or magnesium oxide (C) having an average particle diameter of 5 μm or less in an amount of more than 2.0 parts by mass and 12 parts by mass or less;
  carbon black (D) having a BET specific surface area of 300 to 400 $m^2/g$ in an amount of 5.0 to 16 parts by mass; and
  polyalkylene glycol (E) in an amount of 0.5 to 3.0 parts by mass.
(2) The polyacetal resin composition according to the item (1), wherein the magnesium oxide has a BET specific surface area of 100 $m^2/g$ or more, and has an average particle diameter of 1.5 μm or less.
(3) An automobile part comprising a molded article of the polyacetal resin composition according to the item (1) or (2).
(4) The automobile part according to the item (3), being used under a contact environment with an acidic cleaning agent.
(5) A method for providing an anti-static effect to a polyacetal resin molded article and improving resistance to an acid component, the method using the polyacetal resin composition according to the item (1) or (2).
(6) The method according to the item (5), wherein the acid component is derived from an acidic cleaning agent.

Advantageous Effects of Invention

According to the present invention, the POM resin composition and the automobile part to which resistance to an acid component and an anti-static effect are provided without significant degradation of toughness, and the method for providing an anti-static effect to the POM resin molded article and improving resistance to an acid component can be provided.

BRIEF DESCRIPTION OF DRAWINGS

FIG. 1 is (A) a top view and (B) a back view of a test piece used for mearing a surface resistivity and a volume resistivity in Examples.

DESCRIPTION OF EMBODIMENTS

<Polyacetal Resin Composition>

A POM resin composition of the present embodiment contains a polyacetal copolymer (A) in an amount of 100 parts by mass, the polyacetal copolymer resin having a hemiformal terminal group amount of 0.8 mmol/kg or less, an antioxidant (B) in an amount of 0.5 to 3.0 parts by mass, at least one of zinc oxide or magnesium oxide (C) having an average particle diameter of 5 μm or less in an amount of more than 2.0 parts by mass and 12 parts by mass or less, carbon black (D) having a BET specific surface area of 300 to 400 m$^2$/g in an amount of 5.0 to 16 parts by mass, and polyalkylene glycol (E) in an amount of 0.5 to 3.0 parts by mass.

In the POM resin composition of the present embodiment, at least one of the magnesium oxide or the zinc oxide (C) is mixed by a predetermined amount in the POM resin, and thus resistance to an acid component can be provided. Further, the predetermined carbon black (D) is mixed. Thus, conductivity can be provided, and an anti-static effect can be exerted. Here, in the related art, carbon black or the like is added to exert an anti-static effect, which leads to significant degradation of toughness in combination with the magnesium oxide or the like. However, in the present embodiment, the predetermined carbon black (D) provides conductivity, and hence significant degradation of toughness can be suppressed. The mechanism thereof is described later.

Each of the components of the POM resin composition of the present embodiment is described below.

[Polyacetal Copolymer (A)]

In the present embodiment, the polyacetal copolymer (A) having specific terminal characteristics is used as a base resin. The polyacetal copolymer is a resin having an oxymethylene group (—OCH$_2$—) as a main structural unit and another comonomer unit in addition to the oxymethylene unit. In general, the polyacetal copolymer is manufactured by copolymerizing formaldehyde or a cyclic oligomer of formaldehyde as a main monomer with a compound selected from a cyclic ether or a cyclic formal as a comonomer. Further, in general, unstable parts at the terminal are removed and stabilized by hydrolysis.

In particular, as the main monomer, trioxane being a cyclic trimer of formaldehyde is generally used. Trioxane is generally obtained by reacting an aqueous formaldehyde solution in the presence of an acidic catalyst, and is used after being purified by a method such as distillation. Trioxane used for polymerization preferably contains as little impurities as possible, such as water, methanol, and formic acid, which is as described below.

Further, examples of the cyclic ether or the cyclic formal being the comonomer include ethylene oxide, propylene oxide, butylene oxide, cyclohexene oxide, oxetane, tetrahydrofuran, trioxepane, 1,3-dioxane, 1,3-dioxolane, propylene glycol formal, diethylene glycol formal, triethylene glycol formal, 1,4-butanediol formal, and 1,6-hexanediol formal.

Further, a compound capable of forming a branched or cross-linked structure may be used as the comonomer (or a termonomer), and examples of the compound include alkyl or aryl glycidyl ethers, such as methyl glycidyl ether, ethyl glycidyl ether, butyl glycidyl ether, 2-ethyl-hexyl glycidyl ether, and phenyl glycidyl ether, and diglycidyl ethers of alkylene glycols or polyalkylene glycols, such as ethylene glycol diglycidyl ether, triethylene glycol diglycidyl ether, and butanediol diglycidyl ether. These comonomers may be used alone or in combination of two or more.

The polyacetal copolymer as described above may generally be obtained by adding an appropriate amount of a molecular weight regulator and performing cationic polymerization using a cationic polymerization catalyst. Molecular weight regulators, cationic polymerization catalysts, polymerization methods, polymerization apparatuses, deactivation processes of catalysts after polymerization, terminal stabilization treatments of crude polyacetal copolymers obtained by polymerization, and the like that may be used herein are publicly known from a number of documents, and any of them may basically be used.

The molecular weight of the polyacetal copolymer (A) used in the present embodiment is not particularly limited, and the weight average molecular weight thereof is preferably about 10,000 to about 400,000. Further, a melt mass flow rate (MFR) being an index of fluidity of the resin (measured at 190° C. under a load of 2.16 kg in accordance with ISO 1133) is preferably 0.1 to 100 g/10 min. more preferably, 0.5 to 80 g/10 min.

The polyacetal copolymer (A) used in the present embodiment is required to have the specific terminal characteristics as described above, specifically, is required to have the hemiformal terminal group amount of 0.8 mmol/kg or less.

Here, the hemiformal terminal group is represented by —OCH$_2$OH, and the hemiformal terminal group amount may be obtained by $^1$H-NMR measurement. With regard to the specific measurement method, reference may be made to the method disclosed in Japanese Unexamined Patent Application Publication No. 2001-11143.

When the polyacetal copolymer (A) to be used does not have the above-mentioned terminal characteristics and exceeds the upper limit value, a POM resin composition in which a formaldehyde generation amount is sufficiently reduced cannot be obtained. Moreover, it is difficult to maintain, to a low level, a generation amount of formaldehyde generated due to repeated thermal history.

In such a case, mold deposits generated at the time of molding are excessively increased, which hinders molding. Further, generation of formaldehyde may promote void generation in a molded article, and may cause a failure in mechanical properties.

In such a view of maintaining moldability while maintaining acid resistance, the polyacetal copolymer (A) used in the present embodiment preferably has the hemiformal terminal group amount of 0.6 mmol/kg or less, more preferably, 0.4 mmol/kg or less. The lower limit of the hemiformal terminal group amount is not particularly limited.

The polyacetal copolymer (A) having the specific terminal characteristics as described above may be produced by reducing impurities contained in the monomer and the comonomer, selecting a manufacturing process, optimizing a manufacturing condition, or the like.

Specific examples of the method for manufacturing the polyacetal copolymer (A) having the specific terminal characteristic according to the present embodiment is described below, but the method is not limited thereto.

First, it is important to reduce active impurities forming unstable terminals in the polymerization system, specifically, impurities such as water, alcohols (for example, methanol), and acids (for example, formic acid) contained in the monomer and the comonomer.

As a matter of course, an excessively high content amount of the impurities is not preferred for obtaining a polyacetal copolymer having a small unstable terminal portion. Note that a chain transfer agent that does not form an unstable terminal, for example, a low molecular weight linear acetal having alkoxy groups at both terminals, such as methylal, may be contained by a freely-selected amount, and thus the molecular weight of the polyacetal copolymer may be adjusted.

Next, an amount of a catalyst that is used in a polymerization reaction is also a key factor. An excessively high catalyst amount causes a difficulty in controlling an appropriate polymerization temperature, and a decomposition reaction is dominant during the polymerization. As a result, it is difficult to obtain a polyacetal copolymer having a small unstable terminal portion. In contrast, an excessively low catalyst amount causes reduction in polymerization reaction speed or reduction in polymerization yield, which is not preferred.

Any publicly-known method in the related art may be adopted as the polymerization method. A continuous mass polymerization method for obtaining a polymer in a solid powder mass form along with progression of polymerization using a liquid monomer is industrially preferred. A polymerization temperature is maintained preferably from 60 to 105° C., in particular, from 65 to 100° C.

When a catalyst containing boron trifluoride or a coordination compound thereof is used, a method for adding a polymer after polymerization into an aqueous solution containing a basic compound may be adopted as a method for deactivating the catalyst after polymerization. For the purpose of obtaining the polyacetal copolymer according to the present embodiment, it is preferred that the polymer obtained from the polymerization reaction be pulverized, fragmented, and brought into contact with a deactivation agent so as to deactivate the catalyst quickly.

For example, it is desired that the polymer for catalyst deactivation be pulverized and fragmented so that 80% by mass or more, preferably, 90% by mass of the polymer have a particle diameter of 1.5 mm or less, and 15% by mass or more, preferably, 20% by mass or more have a particle diameter of 0.3 mm or less.

As the basic compound for neutralizing and deactivating the polymerization catalyst, ammonia, amines such as triethylamine, tributylamine, triethanolamine, and tributanolamine, oxides, hydroxides and salts of alkali metals or alkaline earth metals, and other publicly-known catalyst deactivation agents may be used. These basic compounds are preferably added as an aqueous solution in a concentration of 0.001 to 0.5% by mass, particularly, 0.02 to 0.3% by mass.

Further, a preferred temperature of the aqueous solution is from 10 to 80° C., particularly preferably, from 15 to 60° C. Further, after completion of polymerization, it is preferred that the polymer be quickly fed into the aqueous solution for catalyst deactivation.

With reduction of impurities contained in the monomer and the comonomer, selection of the manufacturing process, and optimization of the manufacturing condition that are described above, the polyacetal copolymer with a small unstable terminal amount can be manufactured. Further, by performing a stabilization step, the hemiformal terminal group amount can further be reduced.

Examples of the stabilization step include publicly-known methods such as a method in which the polyacetal copolymer is heated to a temperature equal to higher than a melting point thereof and is subjected to processing under a molten state so as to decompose and remove only an unstable portion, and a method in which the polyacetal copolymer is subjected to heating processing at a temperature equal to or higher than 80° C. while maintaining a heterogeneous system in an insoluble liquid medium so as to decompose and remove only an unstable terminal portion.

[Antioxidant (B)]

Examples of the antioxidant (B) used in the present embodiment include an aromatic amine-based antioxidant and a hindered phenol-based antioxidant. Examples of the aromatic amine-based antioxidant include N-phenyl-1-naphthylamine, bis(4-octylphenyl)amine, 4,4'-bis($\alpha$,$\alpha$-dimethylbenzyl)diphenylamine, p-(p-toluenesulfonylamido)diphenylamine, N,N'-di-2-naphthyl-p-phenylenediamine, N-phenyl-N'-isopropyl-p-phenylenediamine, N-phenyl-N'-(1,3-dimethylbutyl)-p-phenylenediamine, and N-phenyl-N'-(3-methacryloyloxy-2-hydroxypropyl)-p-phenylenediamine. Among those, 4,4'-bis($\alpha$,$\alpha$-dimethylbenzyl) diphenylamine is preferred.

Examples of the hindered phenol-based antioxidant (B) used in the present embodiment include 2,2'-methylenebis(4-methyl-6-t-butylphenol), hexamethylene-bis[3-(3,5-di-t-butyl-4-hydroxyphenyl)propionate], tetrakis[methylene-3-(3,5-di-t-butyl-4-hydroxyphenyl)propionate]methane, triethyleneglycol-bis[3-(3-t-butyl-4-hydroxy-5-methylphenyl)propionate], 1,3,5-trimethyl-2,4,6-tris(3',5'-di-t-butyl-4-hydroxy-benzyl)benzene, n-octadecyl-3-(4'-hydroxy-3',5'-di-t-butylphenyl)propionate, 4,4'-methylenebis(2,6-di-t-butylphenol), 4,4'-butylidenebis(6-t-butyl-3-methylphenol), distearyl(3,5-di-t-butyl-4-hydroxybenzyl) phosphonate, 2-t-butyl-6-(3-t-butyl-5-methyl-2-hydroxybenzyl)-4-methylphenylacrylate, and 3,9-bis{2-[3-(3-t-butyl-4-hydroxy-5-methylphenyl)propionyloxy]-1,1-dimethylethyl}-2,4,8,10-tetraoxaspiro[5,5]undecane. Among those, tetrakis[methylene-3-(3,5-di-t-butyl-4-hydroxyphenyl)propionate]methane and hexamethylene-bis[3-(3,5-di-t-butyl-4-hydroxyphenyl)propionate] are preferred.

In the present embodiment, at least one or two or more types selected from those antioxidants may be used.

In the present embodiment, the amount of the antioxidant (B) is 0.5 to 3.0 parts by mass, preferably, 0.5 to 1.5 parts by mass, with respect to 100 parts by mass of the POM resin (A).

[Zinc Oxide, Magnesium Oxide (C)]

At least one of the zinc oxide or the magnesium oxide having an average particle diameter of 5 μm or less (hereinafter, also referred to as "component (C)") is mixed in the POM resin composition of the present embodiment. The component (C) used in the present embodiment is excellent in balance between improvement of resistance to a cleaning agent (resistance to an acid component (hereinafter, also referred to as "acid resistance")) and performance such as mechanical properties and moldability, which is preferred.

In order to suppress degradation of toughness, the magnesium oxide having an average particle diameter of 5 μm or less is used. Further, the magnesium oxide preferably has a BET specific surface area of 100 m$^2$/g or more and an average particle diameter of 1.5 μm or less. When these conditions are satisfied, acid resistance is easily obtained while suppressing degradation of toughness. The BET specific surface area of the magnesium oxide is preferably 100 to 500 m$^2$/g, more preferably, 120 to 300 m$^2$/g. Further, the average particle diameter of the magnesium oxide is preferably 0.2 to 1.3 μm, more preferably, 0.3 to 1.0 μm. The average particle diameter is determined as a particle diameter corresponding to 50% of the integrated value in a particle size distribution (volume-based) measured by a laser diffraction/scattering method.

In the present embodiment, the amount of the component (C) is preferably more than 2.0 parts by mass and 12 parts by mass or less, more preferably, 5.0 parts by mass or more and 10 parts by mass or less, with respect to 100 parts by mass of the POM resin (A). When the amount thereof exceeds 2.0 parts by mass, the component (C) is particularly excellent in acid resistance. When the amount thereof is 12 parts by mass or less, the component (C) can stably be produced. When the amount thereof is 10 parts by mass or less, the component (C) is particularly excellent in balance of mechanical characteristics. In the related art, an increase of the component (C) may promote decomposition of an unstable terminal in a POM resin. The POM resin (A) of the present embodiment can suppress the decomposition thereof. Therefore, there has successfully been found characteristics in improvement of acid resistance by increasing an amount of the component (C).

[Carbon Black (D)]

In the POM resin composition of the present embodiment, the carbon black (D) having a BET specific area surface of 300 to 400 $m^2/g$ or more (hereinafter, also simply referred to as "carbon black") is mixed by a predetermined amount with respect to the POM resin (A). Further, when the carbon black (D) is added to the POM resin composition, conductivity is provided, and an anti-static effect is exerted while suppressing degradation of toughness. The mechanism for this is inferred as follows: when the BET specific surface area falls within the range, a degree of toughness degradation along with an increase of the specific surface area is relatively small, and sufficient conductivity is provided.

Note that, when carbon black other than the carbon black (D) is added, an anti-static effect is exerted, but toughness of a molded article thus obtained is degraded.

In the present embodiment, as the carbon black (D), carbon black having a BET specific surface area of 300 to 400 $m^2/g$ is used, and the BET specific surface area is preferably 350 to 400 $m^2/g$. A POM resin composition in which carbon black having a BET specific surface area less than 300 $m^2/g$ is mixed has low conductivity, and it is required to increase the amount in order to secure sufficient conductivity. As a result, degradation of toughness cannot be suppressed. In contrast, a POM resin composition in which carbon black having a BET specific surface area exceeding 400 $m^2/g$ is mixed has equivalent conductivity but degraded toughness.

Note that the BET specific surface area may be measured in accordance with ASTM D4820.

Examples of the carbon black (D) as described above include LIONITE EC200L (BET specific surface area: 377 $m^2/g$) produced by Lion Corporation.

In the POM resin composition of the present embodiment, the carbon black (D) in an amount of 5 to 16 parts by mass is mixed with respect to 100 parts by mass of the POM resin. When the amount thereof is less than 5 parts by mass, the carbon black (D) is inferior in conductivity. When the amount thereof exceeds 16 parts by mass, toughness is degraded. The amount of the carbon black is preferably 5 to 15 parts by mass, more preferably, 7 to 15 parts by mass, and further preferably, 10 to 14 parts by mass.

[Polyalkylene Glycol (E)]

In the POM resin composition of the present embodiment, the polyalkylene glycol (E) is mixed by a predetermined amount with respect to the POM resin (A). The type thereof is not particularly limited. In view of compatibility with the POM resin, the type thereof contains preferably polyethylene glycol or polypropylene glycol, more preferably, polyethylene glycol.

The number-average molecular weight (Mn) of the polyalkylene glycol is not particularly limited. In view of dispersibility in the polyacetal resin, the number-average molecular weight is preferably 1,000 or more and 50,000 or less, more preferably, 5,000 or more and 30,000 or less. Note that, in the present application, the number-average molecular weight is assumed to be a number-average molecular weight in terms of polystyrene that is obtained by size exclusion chromatography (SEC) with tetrahydrofuran (THF) as a solvent.

In the present embodiment, the amount of the polyalkylene glycol (E) is 0.5 to 3.0 parts by mass, preferably, 0.8 to 2.5 parts by mass, with respect to 100 parts by mass of the POM resin (A). When the amount of the polyalkylene glycol (E) is less than 0.5 parts by mass, acid resistance and toughness are degraded. When the amount thereof exceeds 3.0 parts by mass, tensile strength is reduced. The upper limit of the amount is selected in view of balance with mechanical properties of the molded article. Two types of the polyalkylene glycol may be mixed and used.

[Other Components]

The POM resin composition of the present embodiment may contain other components as required. One or more kinds of publicly-known stabilizing agents may be added to the POM resin composition as long as the purpose and the effects of the POM resin composition of the present embodiment are not inhibited.

A method of producing a molded article by using the POM resin composition of the present embodiment is not particularly limited, and a publicly-known method may be adopted. For example, a molded article may be produced by feeding the POM resin composition of the present embodiment into an extruding machine, subjecting the POM resin composition to melting/kneading, forming the POM resin composition into pellets, feeding the pellets into an injection molding machine equipped with a predetermined metal mold, and subjecting the pellets to injection molding.

The POM resin composition of the present embodiment described above may be formed into an automobile part described below, or may be a molded article having an anti-static function and resistance to an acid component.

<Automobile Part>

An automobile part of the present embodiment is formed of a molded article of the above-mentioned POM resin composition of the present embodiment. Therefore, the automobile part of the present embodiment is provided with resistance to an acid component and an anti-static effect without significant degradation of toughness. Therefore, the automobile part is suitably used as a flange or a case-like molded article in a periphery of a fuel pump of an automobile. In other words, the automobile is excellent in an anti-static effect, and hence can prevent ignition to fuels due to static electricity. The automobile is excellent in resistance to an acid component, and hence can prevent surface degradation even when a cleaner having strong acidity (pH=approximately 1) adheres thereto. In other words, the automobile part of the present embodiment can be used under a contact environment with an acidic cleaning agent.

The automobile part of the present embodiment may be obtained by using the above-mentioned POM resin composition and performing molding by a common molding method such as injection molding, extrusion molding, compression molding, blow molding, vacuum molding, foam molding, and rotation molding.

Even when the automobile part of the present embodiment contacts with, for example, a cleaning agent having strong acidity of pH 2 or less, degradation can be suppressed, and satisfactory molded-article surface appearance can be maintained.

<Method for Providing Anti-Static Effect to Polyacetal Resin Molded Article and Improving Resistance to Acid Component>

According to the present embodiment, the method for providing an anti-static effect to the polyacetal resin molded article and improving resistance to an acid component uses the above-mentioned POM resin composition of the present embodiment.

As described above, the molded article obtained by molding the POM resin composition of the present embodiment can be provided with resistance to an acid component and an anti-static effect without significant degradation of toughness. In other words, the POM resin composition of the present embodiment is used, and thus resistance to an acid component and an anti-static effect of the POM resin composition can be exerted without significant degradation of toughness. As the acid component, a component derived from an acidic cleaning agent may can be used.

In the method of the present embodiment, each component and a preferred content amount thereof with respect to the POM resin and other components are as described in the above-mentioned POM resin composition of the present embodiment.

EXAMPLES

The present embodiment is further specifically described below with reference to Examples, and the present embodiment is not limited to Examples given below.

Examples 1 to 12, Comparative Examples 1 to 13

In each of Examples and Comparative Example, the respective raw material components illustrated in Table 1 and Table 2 were dry-blended. Then, the resultant was fed into a twin-screw extruding machine at a cylinder temperature of 200° C., subjected to melting/kneading, and formed into pellets. Note that, in Table 1 and Table 2, a numerical value of each component indicates parts by mass.

Further, details of the respective raw material components that were used are described below.

Polyacetal Resin (A) (POM Resin)
  A-1: a POM resin having a hemiformal terminal group amount of 0.7 mmol/kg
  A-2: a POM resin having a hemiformal terminal group amount of 1.0 mmol/kg The MFRs of both A-1 and A-2 that were measured at 190° C. under a load of 2.16 kg in accordance with ISO 1133 were 9 g/10 min.

The polyacetal copolymers A-1 and A-2 were obtained in the following manner.
  A-1: A mixture of 96.7% by mass of trioxane and 3.3% by mass of 1,3-dioxolane was continuously supplied to a continuous polymerization machine of a twin-screw paddle type, and 10 ppm of boron trifluoride was added as a catalyst to carry out polymerization. Further, the mixture of trioxane and 1,3-dioxolane for polymerization contained 10 ppm of water, 3.5 ppm of methanol, and 5 ppm of formic acid as impurities.

An aqueous solution containing triethylamine in an amount of 1,000 ppm was immediately added to the polymer discharged from the discharge port of the polymerization machine. The resultant was subjected to pulverization and stirring processing so as to deactivate the catalyst, and then was subjected to centrifugal separation and drying so as to obtain a crude polyoxymethylene copolymer.

The crude polyoxymethylene copolymer was supplied to a twin-screw extruding machine having a vent port. Then, a 0.3-percent triethylamine aqueous solution was added in an amount of 0.4% to the crude polyoxymethylene copolymer, and the resultant was subjected to melting/kneading at a resin temperature of approximately 220° C. With this, an unstable terminal portion was decomposed. At the same time, a volatile component containing the decomposition product was devolatilized under a reduced pressure through the vent port. The polymer extracted from the die of the extruding machine was cooled and shredded, and thus the polyacetal copolymer A-1 in a form of pellets from which the unstable terminal portion was removed was obtained.

A-2: A mixture of 96.7% by mass of trioxane and 3.3% by mass of 1,3-dioxolane was continuously supplied to a continuous polymerization machine of a twin-screw paddle type, and 15 ppm of boron trifluoride was added as a catalyst to carry out polymerization. Further, the mixture of trioxane and 1,3-dioxolane for polymerization contained[10] ppm of water, 3.5 ppm of methanol, and 5 ppm of formic acid as impurities. After that, the polymer discharged from the discharge port of the polymerization machine was subjected to the processing similar to A-1 described above, and thus the polyacetal copolymer A-2 in a form of pellets was obtained.

Antioxidant (B)
  B-1: tetrakis[methylene-3(3,5-di-t-butyl-4-hydroxyphenyl)propionate]methane (Irganox1010 produced by BASF SE) B-2: 4,4'-bis($\alpha,\alpha$-dimethylbenzyl)diphenylamine (NocRac CD produced by OUCHI SHINKO CHEMICAL INDUSTRIAL Co., Ltd.)

Magnesium Oxide or the Like (C)
  C-1: magnesium oxide having a specific surface area of 140 $m^2$/g and an average particle diameter of 0.9 μm (Kyowamag MF150 produced by Kyowa Chemical Industry Co., Ltd.)
  C-2: magnesium oxide having a specific surface area of 30 $m^2$/g and an average particle diameter of 0.8 μm (Kyowamag MF30 produced by Kyowa Chemical Industry Co., Ltd.)
  C-3: magnesium oxide having a specific surface area of 155 $m^2$/g and an average particle diameter of 7 μm (Kyowamag 150 produced by Kyowa Chemical Industry Co., Ltd.)
  C-4: Zinc oxide (a BET specific surface area of 60 to 90 $m^2$/g) (Active Zinc Oxide AZO produced by Seido Chemical Industry Co., Ltd.)

(Measurement of Average Particle Diameter)

A particle size distribution was measured by a laser diffraction/scattering method under the following measurement conditions through use of a laser diffraction/scattering particle distribution measurement device LA-920 produced by HORIBA. Ltd., and thus the average particle diameter (50% d) corresponding to 50% of the integrated value was obtained.

Measurement Conditions
  Circulation speed: 5
  Laser light source: a He—Ne laser having a wavelength of 632.8 nm; 1 mW, a tungsten lamp; 50W
  Detector: one ring-like 75-cell silicon photodiode, twelve silicon photodiodes
  Dispersion medium: distilled water
  Ultrasonic wave: present
  Transmittance: 75 to 90%
  Relative refractive index with water: 1.32
  Particle size: volume-based Carbon Black (D)

D-1: carbon black (LIONITE EC200L having a BET specific surface area of 377 m$^2$/g, produced by Lion Corporation)
D-2: carbon black (KETJENBLACK EC300J having a BET specific surface area of 800 m$^2$/g, produced by Lion Corporation)
D-3: carbon black (DENKA BLACK having a BET specific surface area of 65 m$^2$/g, produced by Denka Company Limited)
Polyalkylene Glycol (E)
E-1: polyethylene glycol (PEG6000S produced by Sanyo Chemical Industries. Ltd.)

<Evaluation>

The POM resin compositions produced in Examples and Comparative Example were used to produce multi-purpose test pieces described in ISO 294-1 by an injection molding machine (EC40 produced by Toshiba Machine Co., Ltd.) under a condition in accordance with ISO 9988-1, 2. The multi-purpose test pieces were used for the following evaluation items (1) to (3).

(1) Evaluation on Resistance to Acidic Cleaning Agent (Acid Resistance)

For evaluation on resistance to an acidic cleaning agent of the POM resin composition, both the ends of the multi-purpose test pieces were fixed and curved at a load strain ratio of 2.0%. Further, the acidic cleaning agent was sprayed onto the surface of the multi-purpose test pieces, and the multi-purpose test pieces after being subjected to spraying were left for four hours under a condition of 60° C. Then, the tension test pieces were left for four hours under conditions of 23° C. and 50% RH. Subsequently, the acidic cleaning agent was sprayed again, and the multi-purpose test pieces were left for 16 hours under conditions of 23° C. and 50% RH.

As the acidic cleaning agent, the following acidic cleaning agent was used.

Cleaning agent: 1.5% of sulfuric acid, 1.5% of hydrofluoric acid, and 10% of phosphoric acid Actions of spraying an acidic cleaning agent, leaving the multi-purpose test pieces for four hours at 60° C., leaving the multi-purpose test pieces for four hours at 23° C. and 50 RH %, spraying an acidic cleaning agent again, and leaving the multi-purpose test pieces for 16 hours at 23° C. and 50 RH % were included in one cycle. Every time the one cycle was completed, crack generation states on surfaces of dumbbell-like test pieces were visually observed. Further, evaluation was performed based on the cycle number from which a crack was observed, in accordance with the following evaluation criteria. The evaluation results are shown in Table 1 and Table 2.

[Evaluation Criteria]
 A: the number of cycles; 10 or more
 B: the number of cycles; 5 to 9
 C: the number of cycles; 4 or less (2) Evaluation on Tensile Fracture Nominal Strain The multi-purpose test pieces described above were used to measure a tensile fracture nominal strain in accordance with ISO 527-1, 2, and evaluation was performed in accordance with the following evaluation criteria. The evaluation results are shown in Table 1 and Table 2.

[Evaluation Criteria]
 A: 10% or more
 B: 6 to 9%
 C: less than 5%

(3) Conductivity

The above-mentioned multi-purpose test pieces were used to perform evaluation described below.

(Surface Resistivity, Volume Resistivity)

An outer appearance of the multi-purpose test pieces obtained as described above is illustrated in FIG. 1. FIG. 1(A) illustrates the front surface thereof, and FIG. 1(B) illustrates the back surface thereof. A conductive paint (Dotite D500 produced by FUJIKURA KASEI Co., Ltd.) was applied to predetermined regions (hatched regions in FIG. 1) on each of the surfaces of the test piece, and was dried. Then, a low-resistivity measurement device (DIGITAL MULTI METER R6450 produced by ADVANTEST Corporation) was used to measure a resistance between the area A and the area B in FIG. 1(A) as a surface resistivity. Further, a resistance between the area C and the area D in FIG. 1 was measured as a volume resistivity. Evaluation was performed on each of the surface resistivity and the volume resistivity in accordance with the following evaluation criteria. The evaluation results are shown in Table 1 and Table 2. Note that the measurement upper limit for the surface resistivity is $5.0 \times 10^9$ Ω/□, and the measurement upper limit for the volume resistivity is $1.8 \times 10^{11}$ Ω·cm.

[Evaluation Criteria for Surface Resistivity]
 A: $1.0 \times 10^4$ Ω/□ or less
 B: more than $1.0\text{-}10^4$ Ω/□ and $1.0 \times 10^9$ Ω/□ or less
 C: more than $1.0 \times 10^9$ Ω/□

[Evaluation Criteria for Volume Resistivity]
 A: $1.0 \times 10^4$ Ω·cm or less
 B: more than $1.0 \times 10^4$ Ω·cm and $10 \times 109$ Ω·cm or less
 C: more than $1.0 \times 10^9$ Ω·cm (4) Moldability: Mold Deposits The POM resin compositions produced in Examples and Comparative Example were used, and mold deposit test pieces (disk-like shape) were molded under the following conditions.

[Evaluation Method]

After 3,000-shot molding, the surface of the cavity member on the movable mold was visually observed, and the amount of deposits was determined according to the following criteria.

A: No deposits or were observed, or a slight amount of deposits was observed.
 B: A large amount of deposits was observed.

Molding machine: FANUC ROBOSHOT S-2000i 50B (produced by FANUC Corporation)
Molding condition: a cylinder temperature (° C.)
 Nozzle C1 C2 C3
 205 215 205 185° C.
Injection pressure: 40 (MPa)
Injection speed: 1.5 (m/min)
Mold temperature: 60 (° C.)

TABLE 1

|  |  | Examples |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| (A) POM resin | A-1 | 100 | 100 | 100 | 100 | 100 | 100 | 100 | 100 | 100 | 100 | 100 | 100 |
|  | A-2 | — | — | — | — | — | — | — | — | — | — | — | — |

TABLE 1-continued

| | | Examples | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| (B) Antioxidant | B-1 | — | — | — | — | — | — | — | — | — | — | — | 1.0 |
| | B-2 | 0.9 | 0.5 | 2.0 | 0.9 | 0.9 | 0.9 | 0.9 | 0.9 | 0.9 | 0.9 | 0.9 | — |
| (C) Magnesium oxide or zinc oxide | C-1 | 5.0 | 5.0 | 5.0 | 3.0 | 10.0 | — | — | 5.0 | 5.0 | 5.0 | 5.0 | 5.0 |
| | C-2 | — | — | — | — | — | 5.0 | — | — | — | — | — | — |
| | C-3 | — | — | — | — | — | — | — | — | — | — | — | — |
| | C-4 | — | — | — | — | — | — | 5.0 | — | — | — | — | — |
| (D) Carbon black | D-1 | 10.0 | 10.0 | 10.0 | 10.0 | 10.0 | 10.0 | 10.0 | 5.0 | 15.0 | 10.0 | 10.0 | 10.0 |
| | D-2 | — | — | — | — | — | — | — | — | — | — | — | — |
| | D-3 | — | — | — | — | — | — | — | — | — | — | — | — |
| (E) Polyalkylene glycol | E-1 | 2.0 | 2.0 | 2.0 | 2.0 | 2.0 | 2.0 | 2.0 | 2.0 | 2.0 | 0.5 | 3.0 | 1.0 |
| Acid resistance | | A | A | A | B | A | B | B | A | A | A | A | A |
| Tensile fracture nominal strain (toughness) | | B | B | B | B | B | B | B | A | B | B | B | B |
| Conductivity | Surface resistivity [Ω/□] | A | A | A | A | A | A | A | B | A | A | A | A |
| | Volume resistivity [Ω·] | A | A | A | A | A | A | A | B | A | A | A | A |
| Moldability | | A | A | A | A | A | A | A | A | A | A | A | A |

TABLE 2

| | | Comparative Examples | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| (A) POM resin | A-1 | 100 | 100 | 100 | 100 | 100 | 100 | 100 | 100 | 100 | 100 | 100 | 100 | — |
| | A-2 | — | — | — | — | — | — | — | — | — | — | — | — | 100 |
| (B) Antioxidant | B-1 | — | — | — | — | — | — | — | — | — | — | — | — | — |
| | B-2 | 0.9 | 0.9 | 0.9 | 0.9 | 0.9 | 0.9 | 0.9 | 0.9 | 0.9 | 0.9 | 0.9 | 0.9 | 0.9 |
| (C) Magnesium oxide or zinc oxide | C-1 | — | 5.0 | 5.0 | — | 5.0 | 2.0 | 15.0 | — | 5.0 | 5.0 | 5.0 | 5.0 | 5.0 |
| | C-2 | — | — | — | — | — | — | — | — | — | — | — | — | — |
| | C-3 | — | — | — | — | — | — | — | 5.0 | — | — | — | — | — |
| | C-4 | — | — | — | — | — | — | — | — | — | — | — | — | — |
| (D) Carbon black | D-1 | — | — | — | 10.0 | 10.0 | 10.0 | 10.0 | 10.0 | 3.0 | 25.0 | — | — | 10.0 |
| | D-2 | — | — | — | — | — | — | — | — | — | — | 10.0 | — | — |
| | D-3 | — | — | — | — | — | — | — | — | — | — | — | 10.0 | — |
| (E) Polyalkylene glycol | E-1 | — | — | 2.0 | — | — | 2.0 | 2.0 | 2.0 | 2.0 | 2.0 | 2.0 | 2.0 | 2.0 |
| Acid resistance | | C | C | A | C | C | C | A | A | A | A | A | A | A |
| Tensile fracture nominal strain (toughness) | | A | A | A | A | B | A | C | C | B | C | C | B | B |
| Conductivity | Surface resistivity [Ω/□] | C | C | C | A | A | A | A | A | C | A | A | C | A |
| | Volume resistivity [Ω·] | C | C | C | A | A | A | A | A | C | A | A | C | A |
| Moldability | | A | A | A | A | A | A | A | A | A | A | A | A | B |

From Table 1 and Table 2, it can be understood that satisfactory results were obtained for all the evaluation items in each of Examples 1 to 12. In contrast, in Comparative Examples 1 to 13, satisfactory results could not obtained for all the evaluation items at the same time.

Comparative Example 1 was different from Example 1 in that the components (C) to (E) were not mixed, and was inferior in acid resistance and conductivity. Comparative Example 2 was different from Example 1 in that the components (D) and (E) were not mixed, and was inferior in acid resistance and conductivity. Comparative Example 3 was different from Example 1 in that the component (D) was not mixed, and was inferior in conductivity. Comparative Example 4 was different from Example 1 in that the components (C) and (E) were not mixed, and was inferior in acid resistance. Comparative Example 5 was different from Example 1 in that the component (E) was not mixed, and was inferior in acid resistance. Comparative Example 6 was different from Example 1 in that the component (C) was excessively insufficient, and was inferior in acid resistance. Comparative Example 7 was different from Example 1 in that the component (C) was excessively mixed, and was inferior in toughness. Comparative Example 8 was different from Example 1 in that the magnesium oxide having an excessively large average particle diameter was used, and was inferior in toughness. Comparative Example 9 was different from Example 1 in that the component (D) was excessively insufficient, and was inferior in conductivity. Comparative Example 10 was different from Example 1 in that the component (D) was excessively mixed, and was inferior in toughness. Comparative Example 11 was different from Example 1 in that the carbon black having an excessive BET specific surface area was used as the component (D), and was inferior in toughness. Comparative Example 12 was different from Example 1 in that the carbon black having an excessively insufficient BET specific surface area was used as the component (D), and was inferior in conductivity. Comparative Example 13 was different from Example 1 in that the POM resin had an excessive hemiformal terminal group amount, and was inferior in moldability.

The invention claimed is:
1. A polyacetal resin composition, comprising:
a polyacetal copolymer (A) in an amount of 100 parts by mass, the polyacetal copolymer resin having a hemiformal terminal group amount of 0.8 mmol/kg or less;
an antioxidant (B) in an amount of 0.5 to 3.0 parts by mass;
at least one of zinc oxide or magnesium oxide (C) having an average particle diameter of 5 μm or less in an amount of 3.0 parts by mass or more and 12 parts by mass or less;

carbon black (D) having a BET specific surface area of 300 to 400 $m^2/g$ in an amount of 5.0 to 16 parts by mass; and polyalkylene glycol (E) in an amount of 0.5 to 3.0 parts by mass.

2. The polyacetal resin composition according to claim 1, wherein the magnesium oxide has a BET specific surface area of 100 $m^2/g$ or more, and has an average particle diameter of 1.5 μm or less.

3. An automobile part comprising a molded article of the polyacetal resin composition according to claim 1.

4. The automobile part according to claim 3, being used under a contact environment with an acidic cleaning agent.

5. A method for providing an anti-static effect to a polyacetal resin molded article and improving resistance to an acid component, the method using the polyacetal resin composition according to claim 1.

6. The method according to claim 5, wherein the acid component is derived from an acidic cleaning agent.

* * * * *